United States Patent [19]

McMurtry et al.

[11] Patent Number: 4,950,079
[45] Date of Patent: Aug. 21, 1990

[54] COMBINED SCALE AND INTERFEROMETER

[75] Inventors: David R. McMurtry, Wotton-Under-Edge; Raymond J. Chaney, Berkeley, both of United Kingdom

[73] Assignee: Renishaw plc, Gloucestershire, England

[21] Appl. No.: 265,137

[22] PCT Filed: Mar. 7, 1988

[86] PCT No.: PCT/GB88/00166
§ 371 Date: Oct. 25, 1988
§ 102(e) Date: Oct. 25, 1988

[87] PCT Pub. No.: WO88/06712
PCT Pub. Date: Sep. 7, 1988

[30] Foreign Application Priority Data

Mar. 6, 1987 [GB] United Kingdom ............... 8705302

[51] Int. Cl.⁵ ............................................. G01B 9/02
[52] U.S. Cl. ................................. 356/358; 33/503; 250/237 G
[58] Field of Search ............... 356/358; 250/237 G; 33/503

[56] References Cited

FOREIGN PATENT DOCUMENTS

| 0182394 | 8/1985 | European Pat. Off. |
|---|---|---|
| 58-30609 | 2/1983 | Japan |
| 1085502 | 10/1967 | United Kingdom ............... 356/358 |
| 2000867 | 7/1978 | United Kingdom |

OTHER PUBLICATIONS

Doi et al., "An Automatic Calibrating Apparatus for Standard Scales by Counting Interference Fringes", *Applied Optic*, vol. 3, No. 7, pp. 812-823, 7/1964.

*Primary Examiner*—Davis L. Willis
*Assistant Examiner*—Matthew W. Koren
*Attorney, Agent, or Firm*—Oliff & Berridge

[57] ABSTRACT

Measuring apparatus for use in measuring relative movements of two objects and wherein a scale and scale reader are provided mounted respectively on the objects for providing an accurate determination of the relative positions of the two objects with reference to the marks on the scale, the positions of which are accurately known. An interferometer is also provided for measuring the relative movements of the scale and scale reader in order to provide an accurate determination of the relative positions of the two objects at positions between the scale marks. In order to correlate the readings of the scale reader and the interferometer, the scale reader outputs a signal to the interferometer each time a scale mark is detected and the interferometer reading is updated.

9 Claims, 3 Drawing Sheets

SUBSTITUTE SHEET

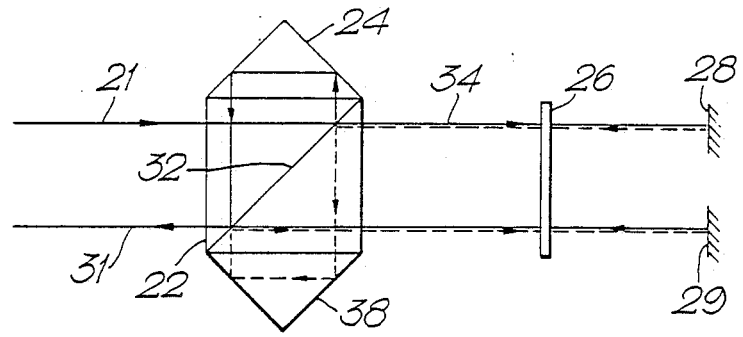
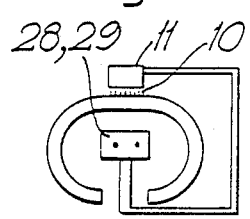
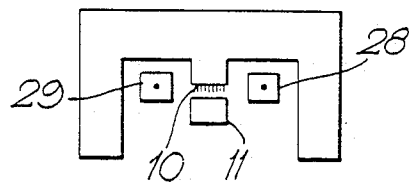
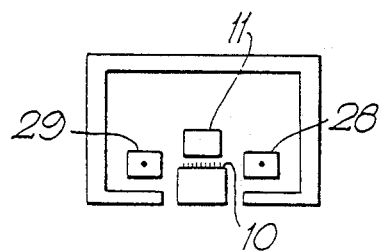

COMBINED SCALE AND INTERFEROMETER

The present invention relates to measuring apparatus for use in measuring relative movements of two objects, which may, for example, be two parts of a machine such as a co-ordinate measuring machine or a machine tool.

Various forms of scales and scale reading apparatus are known, for example, opto-electronic and magnetic. Opto-electronic scales usually include diffraction gratings which require a large number of marks to be placed on them with great accuracy in their manufacture and are thus expensive. Magnetic scales are inherently less accurate than opto-electronic scales but are cheaper to manufacture.

Both of the above types of scale and scale reading apparatus need interpolation devices to improve their resolution so that measurements can be made to a resolution of ±0.5 microns. Interpolation introduces a non-linear error into the resultant readings which is difficult to compensate.

By contrast interferometers can measure directly with a much greater resolution, for example of the order of 0.3 microns, but suffer from the problem that changes in the local refractive index of air will cause variations in the interferometer reading.

In broad terms these problems are overcome in the measuring apparatus according to the present invention, by the combination in the above-mentioned measuring apparatus of a laser interferometer with a scale and a scale reader, the arrangement being such that the scale reader provides an accurate determination of the relative positions of the two objects with reference to the marks on the scale, and the interferometer measures the relative movements of the scale and scale reader in order to provide an accurate determination of the relative positions of the two objects at positions between the scale marks. The scale reader, on detecting a mark outputs a signal which is used to update the instantaneous reading of the measurement of the relative positions of the scale and scale reader given by the interferometer.

The readings from the interferometer detector system may be provided either in the form of an interpolation measurement i.e. the distance measurement from the last scale mark, or as a measurement of the total distance moved by the scale reader from a datum position. It is to be understood that the datum position may be any known position including one of the scale marks.

Upon receipt of the signal from the scale reader the instantaneous reading of the interferometer may be recorded. If an interpolation measurement only is required, the counter of the detector system is updated by being re-set to zero and starts a new interpolation measurement, or, if a total distance measurement is required, the interferometer is up-dated to the accurate scale reader measurement and continues counting from the updated reading.

In one aspect of the invention, in order to provide the accurate determination of the relative positions of the two objects with reference to marks on the scale, the relative positions of at least some of the scale marks are accurately determined either indirectly by calibration, if the marks are not themselves put on the scale with great accuracy, or directly by the scale reader measurements if the marks are themselves accurately relatively positioned. If the marks are sufficiently closely spaced, no allowance need be made for the effect of ambient atmospheric conditions on the interferometer reading.

One advantage of this invention is that the scale can be used to correct the interferometer for changes in the refractive index of air.

In another aspect of the invention the scale markings can be relatively widely spaced and need not be positioned on the scale with the accuracy needed for the present optical scales, provided that the relative positions of the scale markings are accurately established by calibration under controlled conditions after manufacture. Upon receipt of the signal from the scale reader the interferometer reading is checked against the reading of the scale reader and a correction factor is calculated and applied to subsequent interferometer readings in between the scale marks until at the next scale mark a new correction factor is calculated.

Since the interferometer has a high resolution the corrected interferometer reading will give very accurate interpolation between the scale marks. Thus the invention combines the resolution of an interferometer with the accuracy of the scale.

In a preferred form of the invention the scale is a thermally stable scale, by which is meant a scale made from a material having a coefficient of thermal expansion of zero or sufficiently close to zero that normal variations in working temperature will cause a negligible change in the length of the scale. Where the scale is not thermally stable the ambient temperature may be monitored so that the scale reading can be corrected for thermally induced length changes.

When a measurement is required from the machine, a measuring device on the machine, for example a probe, sends a signal to the machine control system to record both of the readings of the scale reader and the interferometer, in the case where the interferometer provides only an interpolation reading, or simply the updated or corrected interferometer reading in the case where the total distance measurement is being provided by the interferometer.

Examples of the invention will now be more particularly described with reference to the accompanying drawings in which:

FIG. 4 is a diagram of one form of optical system constituting the interferometer.

FIGS. 5, 6 and 7 show diagrammatically different arrangements of shielding for the laser beams.

Figure 1:
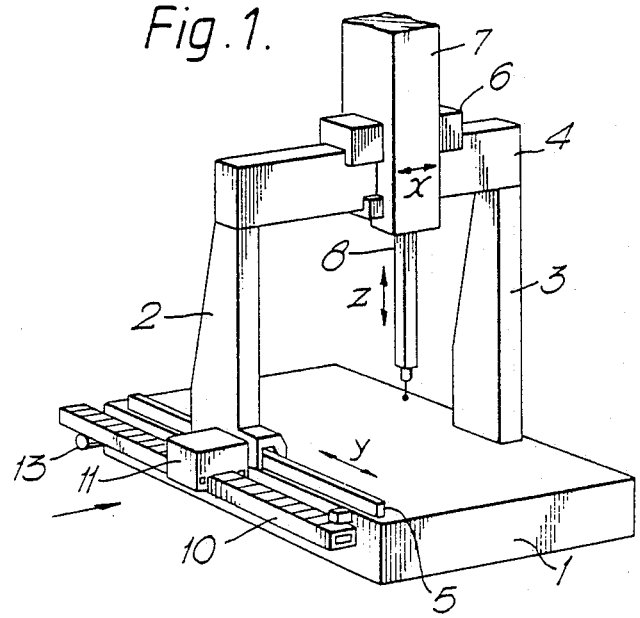
FIG. 1 illustrates one of the slides of a measuring machine with a measuring apparatus of the present invention mounted thereon.

Referring to FIG. 1 there is illustrated a co-ordinate measuring machine having a fixed worktable 1 on which a workpiece to be measured may be mounted, and a co-ordinate framework including uprights 2 and 3 linked by a cross beam 4. The upright 2 runs on an air bearing on a track 5 and the upright 3 runs on an air bearing on the worktable 1 to provide motion in the y-axis as indicated by the arrow y. The cross beam supports a carriage 6 in the x-axis as indicated by the arrow x. The carriage 6 in turn supports a pillar 7 within which the machine spindle 8 is supported on further air bearings to move in the z-axis as shown by the arrow z. The spindle carries a measuring probe 9.

It can be seen therefore that the measuring probe can be positioned anywhere within the working envelope of the machine.

Each of the supports for the moving elements of the machine carries a scale 10 and scale reader 11, whereby the position of the probe in terms of its distance from a datum point along each of the three axes x,y and z can be determined.

Contact of the probe with a workpiece produces in a known manner a signal to the machine control system causing the measurement readings of the scale reader to be recorded and/or displayed.

Only the scale 10 and scale reader 11 on the y-axis is disclosed herein but it should be understood that the invention described below may be applied on all three axes to obtain the most accurate determination of the position of the probe.

Figure 2:
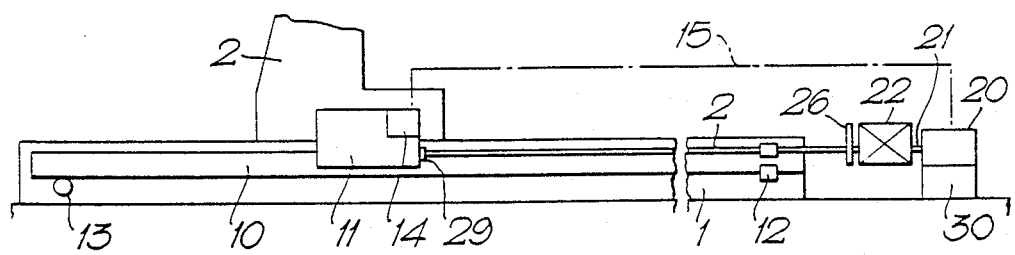
FIG. 2 is an enlarged side elevation of the measuring apparatus of FIG. 1.
Figure 3:
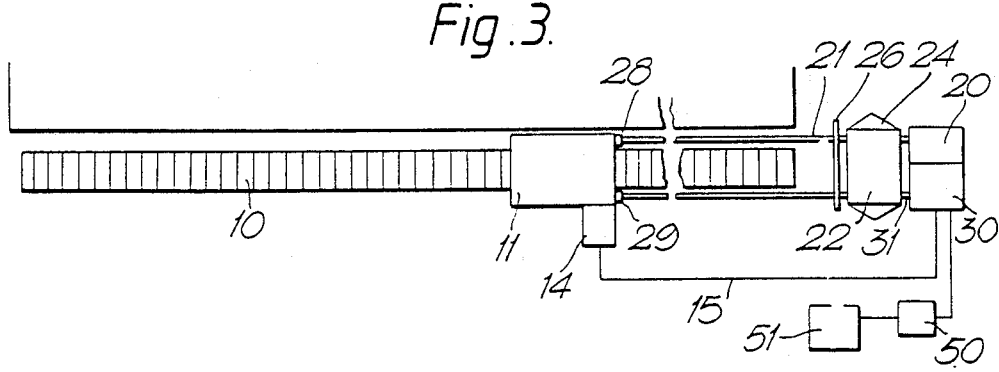
FIG. 3 is a plan view of measuring apparatus of FIG. 2.

Referring now to FIGS. 2 and 3 the measuring apparatus is shown in greater detail. The scale 10 is made from one of the known thermally stable materials, for example, materials sold under the trade names of ZERODUR or CERVIT. The scale is supported from the base 1 by means of a fixing 12 at one end which allows no relative movement with the base, and a roller 13 at the other end which will allow for any relative movements which may take place. By a suitable choice of material for the scale, errors in the measurement of the movement of the upright due to thermal expansion of the scale will be zero or of second order so that they can be neglected. Thus one area of uncertainty in the measurement of a workpiece is removed.

An interferometer system is provided for making independent measurements of the relative movements of the scale and scale reader. The interferometer has several parts including a laser 20 which generates a laser beam 21 polarised in two orthogonal planes, a polarising beam splitter 22 which also includes a retro-reflector 24 which provides the reference arm of the interferometer, a quarter wave plate 26, plane mirrors 28 and 29 carried by the scale reader, and a detector system 30 which counts the interference fringes produced by the combined beam 31 returning from the beam splitter.

The detector system 30 may be of any commercially available type which counts the number of fringes and converts them into the distance measurement which is displayed.

Referring now to FIG. 4, the laser beam 21 from the laser 20 is split at the interface 32 of the polarising beam splitter 22 into a measuring beam 34 and a reference beam 35 which are orthogonally polarised in S and P planes. The reference beam is reflected by the retro-reflector 24 around a fixed path length before being re-combined at the interface 32 with the returning measuring beam 34 to form the combined beam 31.

The measuring beam is transmitted through the interface towards the scale reader and passes through the quarter wave plate 26 during which it becomes circularly polarised, and is reflected with opposite circular polarisation from the plane mirror 28. After passing back through the quarter wave plate 26 it becomes plane polarised again but now in the plane orthogonal to its original plane of polarisation. It is therefore reflected at the interface 32 towards a second retro-reflector 38 which directs it to the interface from which it is again reflected towards the scale reader. On passing through the quarter wave plate it becomes circularly polarised but on reflection from the plane mirror 29 on the scale reader its circular polarisation is reversed so that at the quarter wave plate it becomes plane polarised once again with its original polarisation. Thus it is transmitted through the interface 32 and re-combines with the orthogonally polarised referenced beam to produce the combined beam 31 which is passed to the detector 30.

The detector 30 in known manner detects and counts the interference fringes produced by the combined beam when the scale reader moves thereby indicating in precise manner the movement of the scale reader. As shown with reference to FIGS. 8 and 9 the measurements produced by the interferometer may be passed to the machine as interpolation measurement only, to be added to the readings of the scale reader, or may be total distance measurements read from a display device of the interferometer on the machine.

The invention has various aspects. In one application of the invention the marks on the scale may be put down with a sufficiently narrow spacing that no atmospheric correction is required for the interferometer reading. Two possibilities then arise for providing accurate interpolation between the scale marks using the interferometer.

If the scale marks are applied to the scale in a regular spacing with the accuracy normally associated with optical scales, the measurements made by the scale reader accurately provide the required indication of the position of a given mark relative to a datum position, since the interval between the marks is accurately known. Thus, as the presence of each mark is detected by the scale reader a signal is sent to the interferometer. The signal is used to re-set the interferometer counter to zero if interpolation readings only are required from the interferometer, or to update the interferometer reading with the more accurate reading of the scale reader, ready for interpolation between the detected scale mark and the next mark.

If the scale marks are applied to the scale with less accuracy than is normally associated with optical scales, to minimise the cost of the scale, the scale marks may be irregularly spaced, and the scale will need to be accurately calibrated as described below. The calibration information will then have to be stored to provide the required information as to the position of each mark relative to a datum. The calibration record may be produced on any suitable storage medium for example a chart, a tape, or in a computer memory.

In another application of the invention the scale may be provided with relatively fewer, more widely spaced marks so that atmospheric correction of the interferometer readings is beneficial. The method for providing such atmospheric correction is described below. Once again however, the scale marks may be applied to the scale with accurate regular spacing, or irregular spacing. Thus the means for providing the information as to the position of a detected mark relative to a datum position, would respectively be the measurement reading produced by the scale reader, or the calibration record as described above. In either case the interferometer reading indicating the position of the scale mark is compared to the reading provided by the indicating means to determine the atmospheric correction required for the interpolation readings.

In order to calibrate a scale a laser interferometer may be used operating in vacuum to avoid any error in the calibration due to atmospheric changes. Other methods may, of course, be used. Once the marks are calibrated, a calibration record is produced of the fringe count which should be produced by a laser interferometer using a given wavelength of light in measuring the distance of each mark from a datum position. With neglible error due to thermal effects the scale can now be used as an accurate standard.

During calibration of the scale and scale reader the distance L of the scale reader in meters from the datum position is given by $L=C_v m$ where m is the fringe count from the calibrating interferometer working in vacuum, and $C_v$ is a conversion factor for converting the fringe count in a vacuum to a distance in meters. The interferometer can be made to read in meters by applying the conversion factor.

The measuring apparatus of the present invention uses the accuracy of the physical scale to give accurate distance measurements at each scale mark. By measuring the distance moved by the scale reader, and, where necessary, correcting the interferometer reading at each scale mark for changes in the refractive index of air, the position of the scale reader between the marks can also be accurately determined.

To ensure that the interferometer reading is recorded as the scale reader passes each mark a pulse generator 14 in the detector circuitry of the scale reader generates a pulse every time a mark on the scale is detected. The pulse is passed via connector 15 to the detector circuitry of the laser interferometer where, if atmospheric correction of the interferometer reading is required upon receipt of each pulse, the fringe count of the interferometer is latched and passed to a comparator 50 to be compared with the calibrated fringe count or the scale reading at that particular mark. If a difference is noted, a calculator 51 calculates a new conversion factor, which is the number by which the fringe count of the interferometer must be multiplied to give a corrected distance reading. This new conversion factor is then applied to all subsequent interferometer readings until the next pulse is received from the scale reader. The derivation of the new conversion factor is as follows:

The position of the scale reader in meters at any given scale mark when measured with the interferometer in air is given by $L=C_1 m_1$ and $C_1$ is a variable conversion factor equal to $C_v/n$, $m_1$ is the interferometer fringe count, and n is the refractive index of air at the time of measurement. Since L is known $C_1$ can be calculated at that instant from $C_1 = L/m_1$.

For measurements of the scale reader position between the scale marks the latest correction factor is applied to the interferometer fringe count. The interpolation between the scale marks can thus be performed with the resolution of the interferometer and without introducing further non-linear errors associated with known interpolation devices.

The comparator 50 and calculator 51 may form parts of a micro-processor which performs all of the mathematical computations required and stores the calibration record in its memory.

Figure 8:
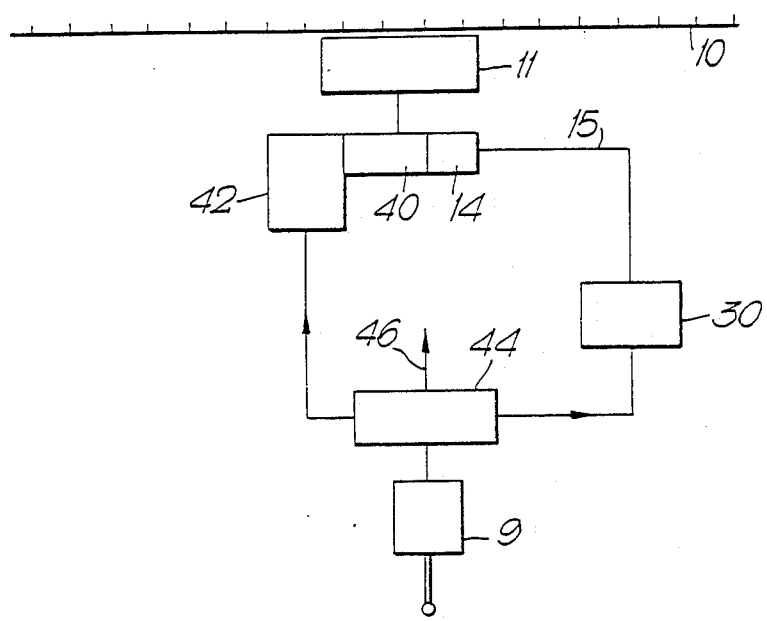
FIGS. 8 and 9 are diagrammatic representations of the interconnections between the scale reader, the interferometer and the machine control system.
Figure 9:
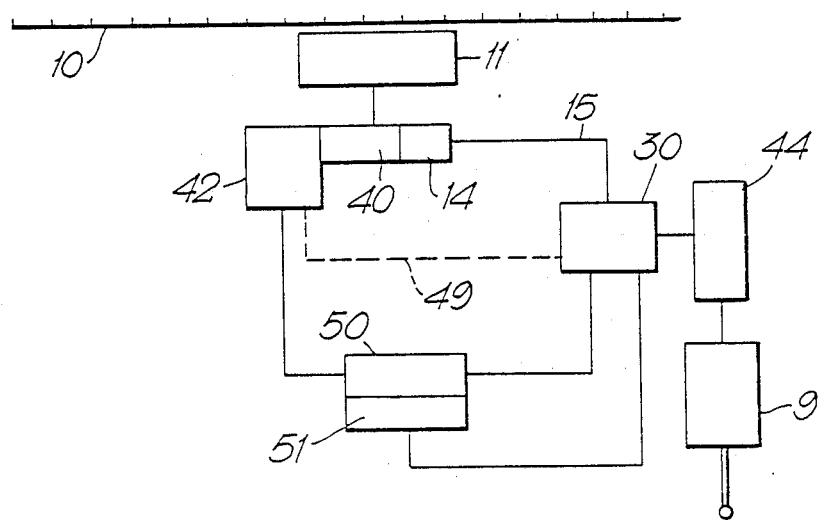

FIGS. 8 and 9 illustrate various ways in which the measurements of the scale reader and the interferometer are used to obtain measurements of a workpiece using the probe.

In general the machine will already be provided with the scale and scale reader and electric circuitry used by the measuring probe for causing the scale reader measurements to be recorded and/or displayed when the probe contacts a workpiece. FIG. 8 illustrates the connections required if the interferometer is to provide interpolation readings only.

In the Figure there is shown the scale 10, the scale reader 11 together with its detector system referenced 40. The detector system includes the pulse generator 14 which is connected via line 15 to the interferometer detector 30 with its associated counter. A device 42 is shown to illustrate the means for providing information as to the position of the detected scale mark. This may be the counter of the scale reader or part of the machine control computer in which is stored the calibration information depending on whether the scale has narrowly spaced marks or more widely spaced marks as described above. The signal from the pulse generator 14 is used to update the interferometer counter by re-setting it to zero every time a scale mark has been reached.

To obtain a reading of a measurement of a workpiece when contacted by the probe 9, the probe sends a signal to the machine control system, indicated at 44, to read the information in the device 42, to determine the distance of the scale mark from the datum, and to latch and read the interferometer counter to determine the distance of the scale reader from the mark. The resulting measurement is output along a line 46 to any convenient recording or display device.

FIG. 9 illustrates the connections required if a distance measurement is required from the interferometer.

Again the signal from the scale reader is passed to the interferometer along line 15. If no compensation is required for atmospheric conditions, the device 42 is arranged to update the interferometer counter by simultaneously passing to the counter the accurate distance reading for the detected scale mark (shown by a dotted line 49). The interferometer will then continue counting from the updated reading until the next scale mark is reached.

If an atmospheric compensation is required the interferometer reading is sent to comparator 50 along with the information from device 42 and calculator 51 updates the interferometer by passing a correction to the interferometer counter to correct its reading for atmospheric conditions. The interferometer will then apply the correction to all further readings until the next scale mark is reached.

When the measuring probe contacts a workpiece therefore, the machine control system need only latch and record the interferometer distance reading.

Although the scale has been described as thermally stable, it is not essential, since by monitoring the ambient temperature any thermally induced length changes in the scale can be calculated and compensated. Since the ambient temperature will in any case be monitored so that changes in workpiece dimensions due to temperature can be calculated, it may in some cases be beneficial to have a scale made of a material having the same coefficient of thermal expansion as the material of the workpiece so that such variations in dimensions of the workpiece are automatically compensated. This is however, only practical if all parts to be measured on the machine have the same coefficient of thermal expansion.

Alternative arrangements of the scale, scale reader and interferometer are possible other than that described above as shown in FIGS. 5, 6 and 7.

Referring now to these figures:

FIG. 5 shows the scale in the form of a hollow channel-shaped tube in which a single plane mirror carried by the scale reader 10 is disposed. This enables the laser beams of the interferometer to be protected to some degree from the environment and in particular from turbulence in the air which would affect the laser beams.

FIG. 6 shows an embodiment in which the scale member is E-shaped and the scale marks are formed on the underside of the short flange of the E-shape. The scale reader and the laser beams are both disposed inside the scale member.

FIG. 7 shows an embodiment in which all of the scale member, the scale reader and the laser beams of the interferometer are contained within an enclosure.

To minimise errors which may arise due to pitching moments of the scale reader as it moves along the scale, the two laser beams are preferably directed alongside the scale in the same plane as the scale.

Use of two laser beams as shown in the preferred embodiment also minimises any errors due to yawing movements of the scale reader in operation.

Although the invention has been described as applied to a co-ordinate measuring machine, it is equally applicable to making accurate measurements of moving parts of machine tools.

We claim:

1. Measuring apparatus for measuring relative movements between two objects comprising:
    a scale attached to one of the objects and having spaced marks thereon the relative positions of which are accurately known,
    a scale reader attached to the other one of the objects and which includes a detector system for detecting the presence of scale marks as they attain a known position relative to the scale reader during said relative movement of the objects, and for providing an output signal indicative of the presence of a mark,
    recording means for providing information as to the position of the detected mark,
    an inteferometer arranged to measure the relative movement between the scale and scale reader along the scale and to provide an output indicative of the amount of said movement,
    means for passing the output signal from the scale reader to the interferometer, and simultaneously with the receipt thereof by the interferometer causing the output of the interferometer to be updated, and
    means for interrogating the output of the interferometer alone or in conjunction with the recording means to determine the relative movement between the two objects.

2. Measuring apparatus as claimed in claim 1 and wherein the scale marks are regularly spaced.

3. Measuring apparatus as claimed in claim 1 and wherein the scale marks are irregularly spaced.

4. Measuring apparatus as claimed in claim 1 and wherein the interferometer output is indicative of the distance moved by the scale reader from the position of the last detected mark.

5. Measuring apparatus as claimed in claim 4 and wherein the interferometer output is updated by being re-set to zero as each mark is detected by the scale reader.

6. Apparatus as claimed in claim 1 and wherein the interferometer output is indicative of the total distance of the scale reader from a datum position.

7. Apparatus as claimed in claim 6 and wherein the interferometer output is updated by the input of information from the recording means.

8. Apparatus as claimed in claim 6 and wherein the marks on the scale are relatively widely spaced and there is provided a comparator for comparing the outputs of the interferometer and the recording means and for providing a signal indicative of a difference between them, a calculator for calculating a correction factor to be applied to the interferometer output to make it equal to the output of the recording means, and wherein the output of the interferometer is updated by applying the correction factor to the interferometer output until the next output signal from the scale reader is received by the interferometer.

9. Apparatus as claimed in claim 1 and wherein the scale is made from a thermally stable material.

* * * * *